US009076306B2

(12) United States Patent
Beaulieu et al.

(10) Patent No.: US 9,076,306 B2
(45) Date of Patent: Jul. 7, 2015

(54) WAGERING GAMING DEVICE PROVIDING PHYSICAL STIMULATION RESPONSES TO VARIOUS COMPONENTS OF THE GAMING DEVICE

(75) Inventors: Nicole M. Beaulieu, Reno, NV (US); Aaron T. Jones, Reno, NV (US)

(73) Assignee: IGT, Las Vegas, NV (US)

( * ) Notice: Subject to any disclaimer, the term of this patent is extended or adjusted under 35 U.S.C. 154(b) by 1318 days.

(21) Appl. No.: 12/031,647

(22) Filed: Feb. 14, 2008

(65) Prior Publication Data

US 2008/0139297 A1 Jun. 12, 2008

Related U.S. Application Data

(63) Continuation of application No. 10/244,125, filed on Sep. 13, 2002, now Pat. No. 7,331,868.

(51) Int. Cl.

*G06F 17/00* (2006.01)
*G07F 17/34* (2006.01)
*G07F 17/32* (2006.01)

(52) U.S. Cl.

CPC ................ *G07F 17/34* (2013.01); *G07F 17/32* (2013.01)

(58) Field of Classification Search

USPC .............................. 463/29, 30, 40, 43, 32, 20
See application file for complete search history.

(56) References Cited

U.S. PATENT DOCUMENTS 3,796,433 A 3/1974 Fraley et al.
4,058,026 A 11/1977 Simpson
4,198,052 A 4/1980 Gauselmann
4,236,717 A 12/1980 Wichinsky
4,353,554 A 10/1982 Fisher
4,426,082 A 1/1984 Heywood et al.
4,522,399 A 6/1985 Nishikawa
4,582,324 A 4/1986 Koza et al.
4,618,150 A 10/1986 Kimura
4,695,053 A 9/1987 Vazquez, Jr. et al.
4,712,799 A 12/1987 Fraley (Continued)

FOREIGN PATENT DOCUMENTS

EP 0 918 307 5/1999
EP 0 918 307 A 5/1999

(Continued)

OTHER PUBLICATIONS

European Search Report dated Mar. 23, 2010.

(Continued)

*Primary Examiner* — Paul A D'Agostino
*Assistant Examiner* — Brandon Gray
(74) *Attorney, Agent, or Firm* — Neal, Gerber & Eisenberg LLP

(57) ABSTRACT

A wagering gaming device that physically stimulates an input device of the gaming device to stimulate a player. The input device, includes a component stimulator and an actuation member. The input devices sends a signal or plurality of signals to a processor upon actuation of the actuation member of the input device. The processor sends an electronic signal to the component stimulator. The component stimulator causes the physical stimulation of the actuation member. The player feels this movement, which may be in correlation to the image being displayed by a display device. This physical stimulation of an input device may be employed in any suitable manner in relation to a game in a wagering gaming device.

40 Claims, 14 Drawing Sheets

(56) References Cited

U.S. PATENT DOCUMENTS

| | | | |
|---|---|---|---|
| 4,871,171 A | 10/1989 | Rivero | |
| 5,277,424 A | 1/1994 | Wilms | |
| 5,342,047 A | 8/1994 | Heidel et al. | |
| 5,364,100 A | 11/1994 | Ludlow et al. | |
| 5,397,125 A | 3/1995 | Adams | |
| 5,429,507 A | 7/1995 | Kaplan | |
| 5,449,173 A | 9/1995 | Thomas et al. | |
| 5,472,197 A | 12/1995 | Gwiasda et al. | |
| 5,655,965 A | 8/1997 | Takemoto et al. | |
| 5,669,818 A | 9/1997 | Thorner et al. | |
| 5,695,188 A | 12/1997 | Ishibashi | |
| 5,758,875 A | 6/1998 | Giacalone, Jr. | |
| 5,769,716 A | 6/1998 | Saffari et al. | |
| 5,796,389 A | 8/1998 | Bertram et al. | |
| 5,823,872 A | 10/1998 | Prather et al. | |
| 5,823,874 A | 10/1998 | Adams | |
| 5,833,536 A | 11/1998 | Davids et al. | |
| 5,910,046 A | 6/1999 | Wada et al. | |
| 5,919,088 A | 7/1999 | Weiss | |
| 5,927,714 A | 7/1999 | Kaplan | |
| 5,934,672 A | 8/1999 | Sines et al. | |
| 5,947,820 A | 9/1999 | Morro et al. | |
| 5,951,397 A | 9/1999 | Dickinson | |
| 5,976,015 A | 11/1999 | Seelig et al. | |
| 5,977,867 A | 11/1999 | Blouin | |
| 5,997,400 A | 12/1999 | Seelig et al. | |
| 5,997,401 A | 12/1999 | Crawford | |
| 6,008,800 A | 12/1999 | Pryor | |
| 6,015,346 A | 1/2000 | Bennett | |
| 6,017,033 A | 1/2000 | Keller | |
| 6,030,291 A | 2/2000 | Maki et al. | |
| 6,067,081 A | 5/2000 | Hahlganss et al. | |
| 6,071,192 A | 6/2000 | Weiss | |
| 6,086,066 A | 7/2000 | Takeuchi et al. | |
| 6,102,798 A | 8/2000 | Bennett | |
| 6,110,039 A | 8/2000 | Oh | |
| 6,110,041 A | 8/2000 | Walker et al. | |
| 6,113,098 A | 9/2000 | Adams | |
| 6,120,031 A | 9/2000 | Adams | |
| 6,125,385 A | 9/2000 | Wies et al. | |
| 6,135,884 A | 10/2000 | Hedrick et al. | |
| 6,159,095 A | 12/2000 | Frohm et al. | |
| 6,165,070 A | 12/2000 | Nolte et al. | |
| 6,169,595 B1 | 1/2001 | Manne | |
| 6,174,233 B1 | 1/2001 | Sunaga et al. | |
| 6,174,235 B1 | 1/2001 | Walker et al. | |
| 6,190,255 B1 | 2/2001 | Thomas et al. | |
| 6,201,533 B1 | 3/2001 | Rosenberg et al. | |
| 6,210,279 B1 | 4/2001 | Dickinson | |
| 6,219,032 B1 | 4/2001 | Rosenberg et al. | |
| 6,231,445 B1 * | 5/2001 | Acres | 463/42 |
| 6,238,288 B1 | 5/2001 | Walker et al. | |
| 6,254,481 B1 * | 7/2001 | Jaffe | 463/20 |
| 6,267,669 B1 | 7/2001 | Luciano, Jr. et al. | |
| 6,270,408 B1 | 8/2001 | Sakamota et al. | |
| 6,270,410 B1 | 8/2001 | DeMar et al. | |
| 6,270,411 B1 * | 8/2001 | Gura et al. | 463/20 |
| 6,270,412 B1 | 8/2001 | Crawford et al. | |
| 6,287,197 B1 | 9/2001 | Dickinson et al. | |
| 6,293,866 B1 | 9/2001 | Walker et al. | |
| 6,296,568 B1 | 10/2001 | Tracy | |
| 6,302,790 B1 | 10/2001 | Brossard | |
| 6,308,953 B1 | 10/2001 | Nagano | |
| 6,315,663 B1 | 11/2001 | Sakamoto | |
| 6,319,124 B1 * | 11/2001 | Baerlocher et al. | 463/20 |
| 6,338,678 B1 | 1/2002 | Seelig et al. | |
| 6,340,158 B2 | 1/2002 | Pierce et al. | |
| 6,343,988 B1 | 2/2002 | Walker et al. | |
| 6,347,813 B1 | 2/2002 | Star et al. | |
| 6,364,766 B1 | 4/2002 | Anderson et al. | |
| 6,366,272 B1 | 4/2002 | Rosenberg et al. | |
| 6,386,974 B1 | 5/2002 | Adams | |
| 6,443,837 B1 | 9/2002 | Jaffe et al. | |
| 6,450,884 B1 | 9/2002 | Seelig et al. | |
| 6,454,649 B1 | 9/2002 | Mattice et al. | |
| 6,476,798 B1 | 11/2002 | Bertram et al. | |
| 6,485,367 B1 | 11/2002 | Joshi | |
| 6,517,433 B2 | 2/2003 | Loose et al. | |
| 6,533,660 B2 | 3/2003 | Seelig et al. | |
| 6,563,487 B2 | 5/2003 | Martin et al. | |
| 6,942,571 B1 | 9/2005 | McAllister et al. | |
| 2002/0033795 A1 | 3/2002 | Shahoian | |
| 2002/0160826 A1 * | 10/2002 | Gomez et al. | 463/16 |
| 2003/0018403 A1 * | 1/2003 | Braun et al. | 700/45 |
| 2003/0073478 A1 | 4/2003 | Kovacs | |
| 2004/0038722 A1 * | 2/2004 | Gauselmann | 463/16 |
| 2004/0166937 A1 | 8/2004 | Rothschild et al. | |
| 2004/0180715 A1 | 9/2004 | Nordman | |
| 2004/0235558 A1 | 11/2004 | Beaulieu et al. | |

FOREIGN PATENT DOCUMENTS

| | | |
|---|---|---|
| EP | 1 079 344 | 2/2001 |
| EP | 1 079 344 A | 2/2001 |
| JP | 11-162277 | 6/1999 |
| WO | WO 96/08295 | 3/1996 |

OTHER PUBLICATIONS

Notification on the results of examination of the patentability of invention for Russian Application No. 2005110940/09(012757).

"Welcome to the Real Touch" Roulette Brochure, written by Atronic Casino Technology, Inc., published in Aug. 1999.

Instant SLOTTO Article, written by Strictly Slots, published in Apr. 2001.

Poker Speed Change Input Screens, by IGT, available prior to Feb. 14, 2008.

Reel Spin Stop Input Screens, by IGT, available prior to Feb. 14, 2008.

* cited by examiner

WAGERING GAMING DEVICE PROVIDING PHYSICAL STIMULATION RESPONSES TO VARIOUS COMPONENTS OF THE GAMING DEVICE

PRIORITY CLAIM

This application is a continuation application of, claims priority to and the benefit of U.S. patent application Ser. No. 10/244,125 filed on Sep. 13, 2002, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Wagering gaming devices are well known. Players operate gaming devices by performing certain actions such as pressing buttons, pulling levers or pressing designated areas of touch screens. In many known primary or base games of wagering gaming devices, players use control features to actuate a set of reels and then watch the mechanical reels or a display device showing the video reels spin, change or move. In a video poker game, the player's interaction with the wagering gaming device includes using the control device to trigger distribution of a card or cards. In a keno game, the player's interaction includes the selection of certain entries.

Likewise, in secondary or bonus games associated with a wagering gaming device, the player's interaction with the gaming device includes the initiation of the bonus game, for example by pressing a button to spin a wheel displaying awards. If the wagering gaming device provides any additional displays such as animation, advertising or other gaming information, the player generally observes the display.

To maintain player interest, it is desirable to provide a wagering gaming device which provides increased interaction between the player and the wagering gaming device by physically stimulating various components of the wagering gaming device and thus the player.

SUMMARY

The present invention provides a wagering gaming device that physically stimulates one or more components of the gaming device. More specifically, one embodiment of the present invention provides a processor controlled wagering gaming device, wherein the processor is in communication with a display device and at least one input device. In one embodiment, the input device includes a component stimulator and an actuation member. When the player uses the input device and specifically an actuation member of the input device to interact with the gaming machine, the processor sends a signal to the component stimulator of the input device, and the component stimulator actuates the actuation member. The player feels this actuation or movement, which is preferably in correlation with an event or game function occurring in the game such as a video image displayed by the display device in the game. This physical stimulation of the actuation member may be employed in primary or base game, a secondary or bonus game or in any standalone wagering game.

In one embodiment, the actuation member of the wagering gaming device is physically stimulated by the component stimulator in correlation to a game initiation, occurrence, event, function or outcome. In one embodiment, the display device includes a video monitor and a touch screen. The video monitor displays a game such as a plurality of reels. The touch screen defines a uniform electric field. Electrodes spread out the voltage that is applied to the four-corners of the screen or touchable panel of the touch screen. The touch screen includes a component stimulator and an actuation member and is connected to and communicates with the processor of the wagering gaming device through a touch screen controller. In one embodiment, the player may initiate movement or spinning or otherwise actuate the reels by contacting one or more points on the screening panel or front faces of the touch screen in which one or more of the reels are displayed, using a member such as a finger. Upon receipt of a signal encoding such initiation instructions, the processor sends a signal to the component stimulator, which physically stimulates the contacted coordinate(s) of the screening panel or front face of the touch screen, also referred to herein as the actuator member. For example, upon actuation of the reel, the screen panel vibrates at the contacted coordinates. The player feels the vibrations and accordingly receives physical stimulation in response to actuation of the touch screen.

In one embodiment, the actuation member of the input device is stimulated by the component stimulator after initiation of the game and preferably during game play. In one example involving a video poker game, a player may contact the screen panel of the touch screen at a certain point to hold certain cards and draw additional cards. The processor sends a signal to the component stimulator. The component stimulator vibrates the screen panel or actuator member of the touch screen in the area of the cards being held by the player. This provides a feedback or stimulation of the player to confirm that the card will be held. Thus, the present invention can be employed to confirm player action.

In another embodiment, an input device may change in resistance in correlation to the player's actuation of the input device. For example, in a slot game, the player begins the game by pressing a button of an input device to spin the reels. The game instructs and the player continues pressing the button, as the reels keep spinning. The gaming device causes an increased resistance in the button. It should be appreciated, that this type of resistance may be employed in other input devices and may correlate with one or more game elements or game functions.

In an alternative embodiment, the actuation member of the input device is stimulated in correlation to a game event or result. For example, on a slot machine game, a player pulls a lever to spin the reels. As each reel stops, the processor sends a signal to a component stimulator, which, in turn, vibrates the actuator member of the input device.

In other embodiments, the stimulated input devices may include other suitable devices such as a mouse, a light pen, a keyboard, joystick, touch pad, or a trackball. Each component is physically stimulated either at initiation of game play, during game play or following a game result. It should be appreciated that the physical stimulation of components may be associated not only with game outcomes, but any other types of displays, such as advertisements, messages, or other gaming-related displays.

It is therefore an advantage of the present invention to provide a wagering gaming device providing physical stimulation to a component of the wagering gaming device.

Additional features and advantages of the present invention are described in, and will be apparent from, the following Detailed Description of the Invention and the Figures.

DETAILED DESCRIPTION

Wagering Gaming Device and Electronics

Figure 1A:
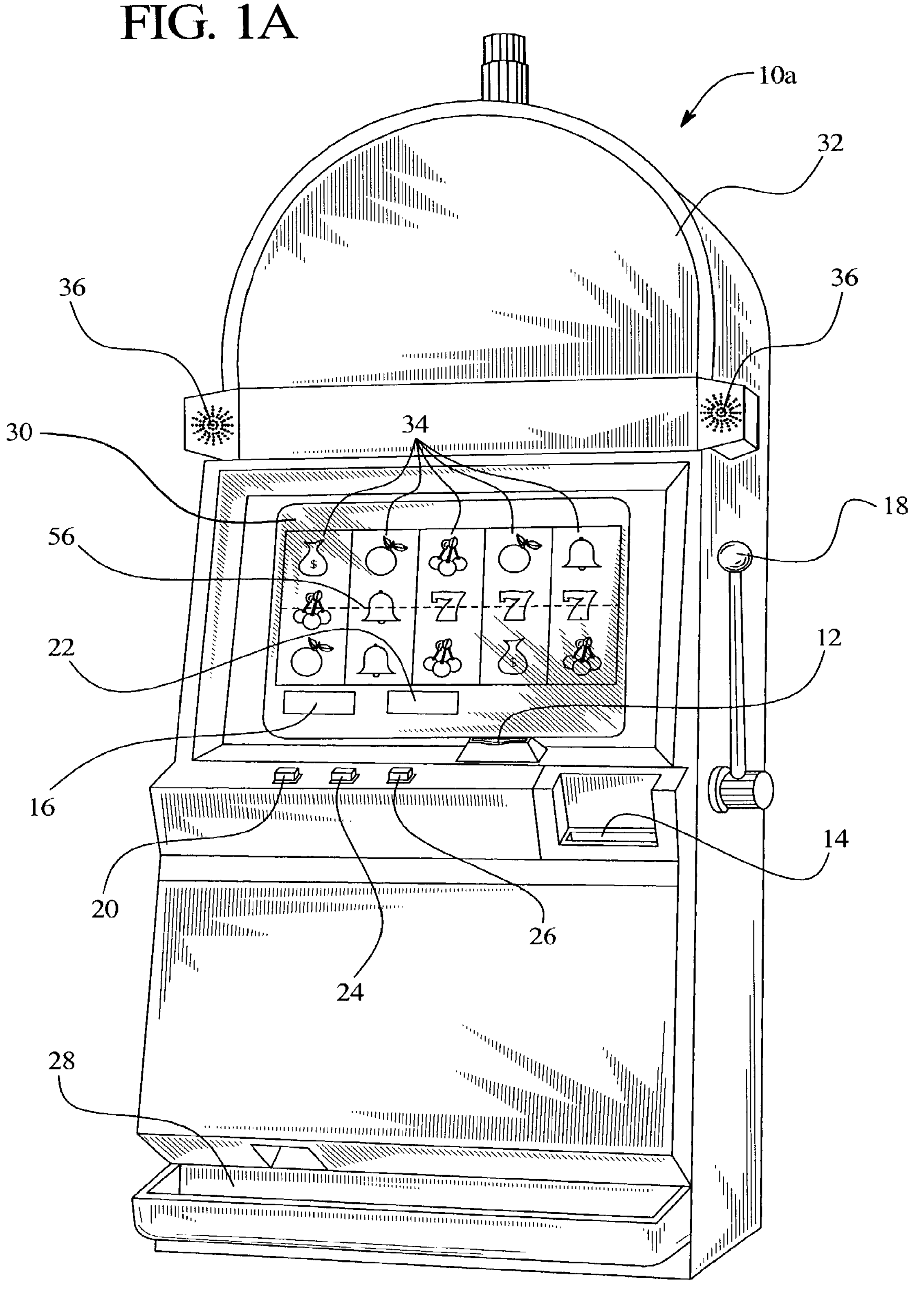
FIGS. 1A and 1B are perspective views of alternate embodiments of the wagering gaming device of the present invention.
Figure 1B:
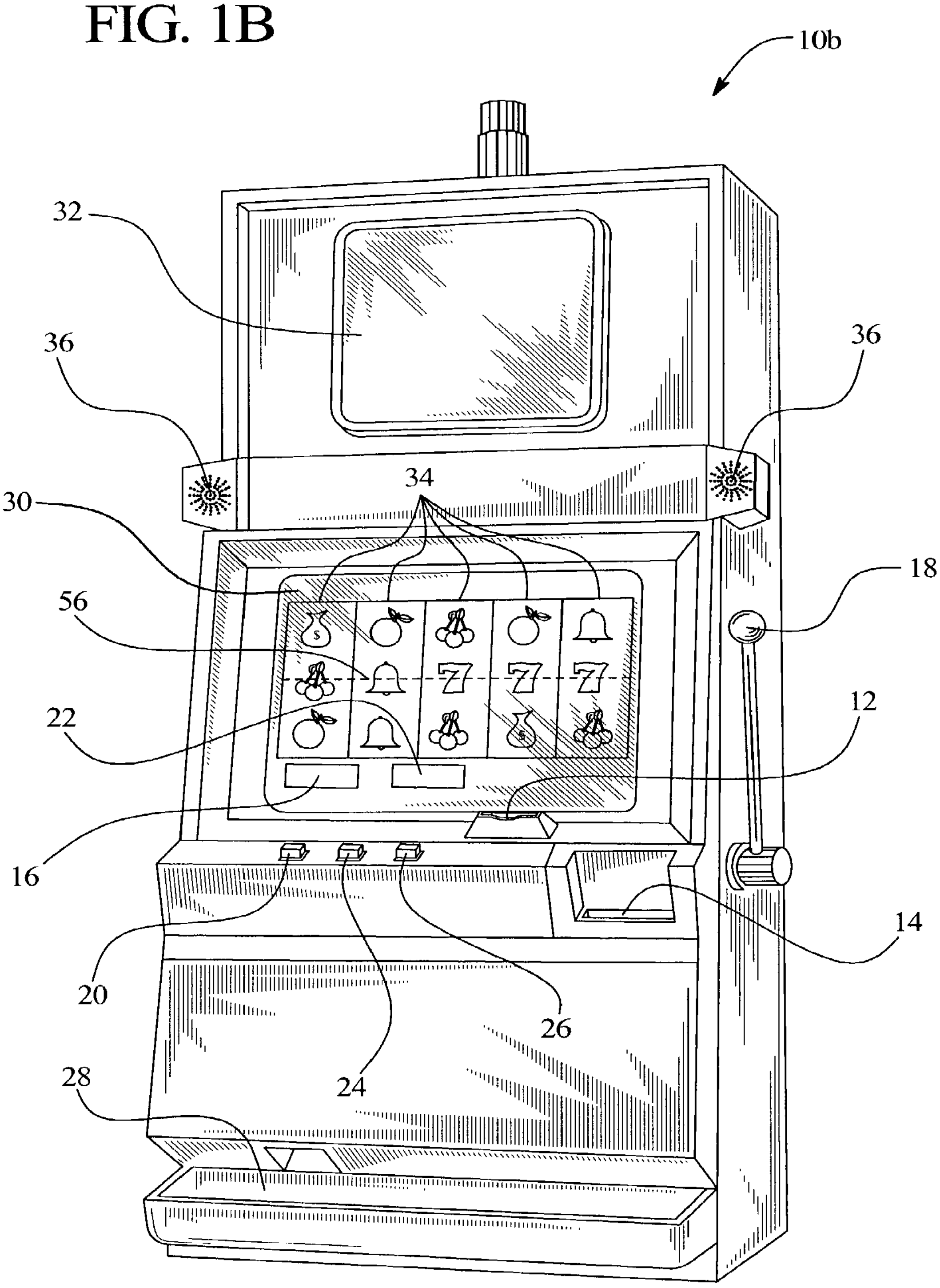

Referring now to the drawings, and in particular to FIGS. 1A and 1B, wagering gaming device 10*a* and wagering gaming device 10*b* illustrate two possible cabinet styles and display arrangements and are collectively referred to herein as wagering gaming device 10. The present invention includes any game being a stand alone game or a bonus or secondary game that coordinates with a base game. The player can operate the gaming device while standing or sitting. Gaming device 10 also includes being a pub-style or table-top game (not shown), which a player operates while sitting.

The gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in wagering gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the wagering gaming device.

As shown in FIGS. 1A and 1B, wagering gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card.

Wagering gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including video images. The display device includes any viewing surface such as glass, a video monitor or screen, a liquid crystal display or any other static or dynamic display mechanism. In a video poker, blackjack or other card gaming machine embodiment, the display device includes displaying one or more cards.

The slot machine base game of wagering gaming device 10 displays a plurality of reels 34, preferably three to five reels 34, in video form on one or more of the display devices. Each reel 34 displays a plurality of indicia such as bells, hearts, fruits, numbers, letters, bars or other images which preferably correspond to a theme associated with the gaming device 10. Each base game, especially in the slot machine base game of the gaming device 10, includes speakers 36 for making sounds or playing music.

Figure 2:
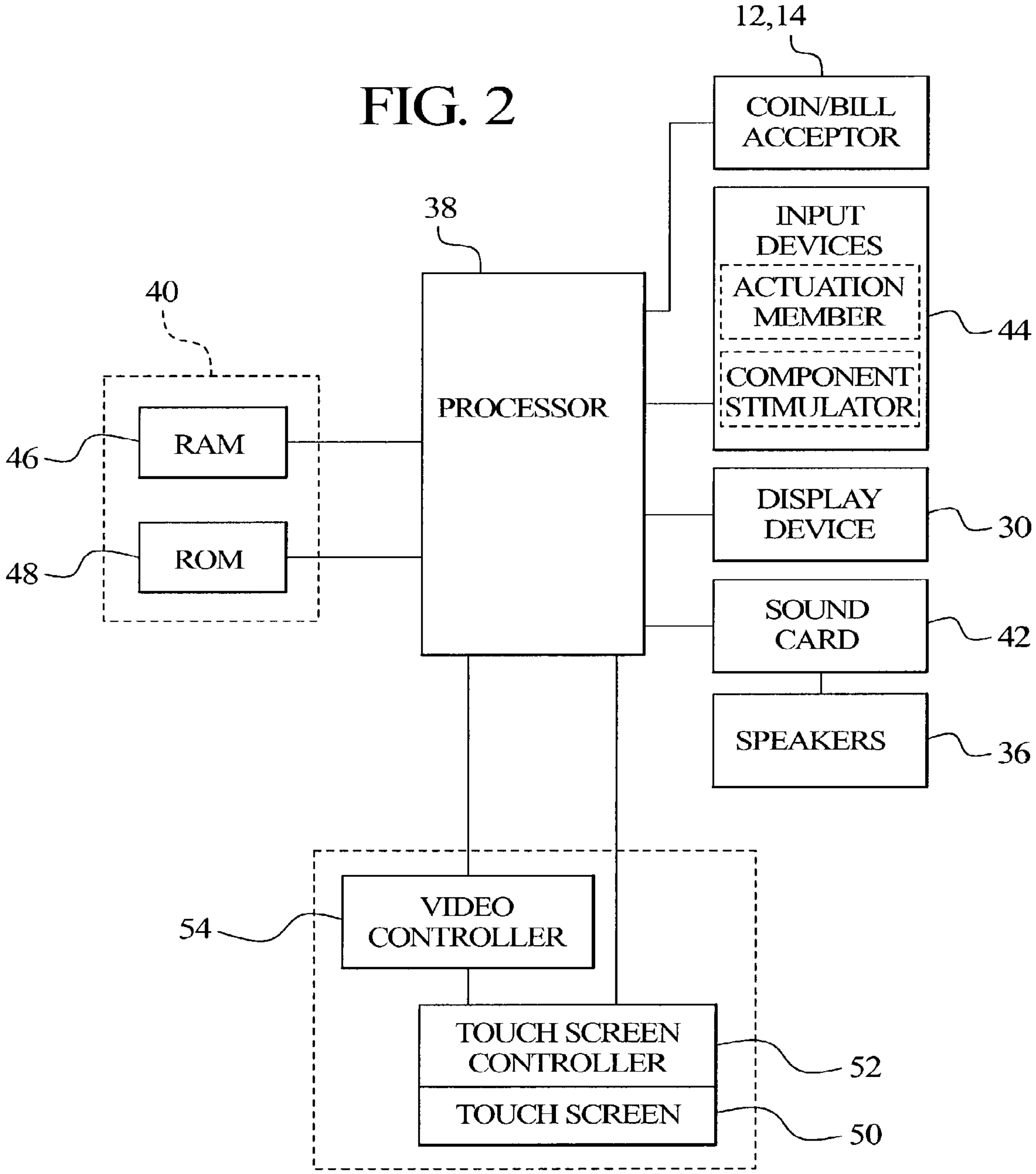
FIG. 2 is a schematic block diagram of the electronic configuration of one embodiment of the wagering gaming device of the present invention.

Referring now to FIG. 2, a general electronic configuration of the wagering gaming device 10 for the stand alone and bonus embodiments described above preferably includes: a processor 38; a memory device 40 for storing program code or other data; a central display device 30; an upper display device 32; a sound card 42; a plurality of speakers 36; one or more input devices 44 each including a component stimulator 55 and an actuation member. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the wagering gaming device 10 so that it plays a particular game in accordance with applicable game rules and paytables. The component stimulator can be any suitable device capable of receiving signals from the processor and transmitting physical stimulation responses to the actuator member as well as other components of the wagering gaming device. The actuator member may be any suitable part of any suitable input device such as a mouse, a touch screen, a touch pad, a trackball, or a keyboard.

As illustrated in FIG. 2, the player preferably uses the input devices 44 to input signals into gaming device 10. In the slot machine base game, the input devices 44 include the pull arm 18, play button 20, the bet one button 24 and the cash out button 26.

In certain instances, it is preferable to use a touch screen 50 and an associated touch screen controller 52 instead of a conventional video monitor display device. The touch screen enables a player to input decisions into the wagering gaming device 10 by sending a discrete signal based on the area of the touch screen 50 that the player touches or presses. The terms "computer" or "controller" are used herein to refer collectively to the processor 38, the memory device 40, the sound card 42, the touch screen controller 52 and the video controller 54. As further illustrated in FIG. 2, the processor 38 connects to the coin slot 12 or payment acceptor 14, whereby the processor 38 requires a player to deposit a certain amount of money in the gaming device to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively and/or alternatively referred to herein as a "processor"). Furthermore, although the processor 38 and memory device 40 preferably reside in each wagering gaming device coordinate, the present invention includes providing some or all of their functions at a central location such as a network server for communication to a playing station such as over a date network such as local area network (LAN), wide area network (WAN), Internet connection, microwave link, and the like.

With reference to the slot machine base game of FIGS. 1A and 1B, to operate the wagering gaming device 10, the player inserts the appropriate amount of tokens or money in the coin slot 12 or the payment acceptor 14 and then pulls the arm 18 or pushes the play button 20. In a slot embodiment the reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the wagering gaming device 10, including any of the base games disclosed above, also includes bonus games that give players the opportunity to win credits. The wagering gaming device 10 employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

In another embodiment, the qualifying condition includes a particular card combination in a video poker or blackjack game.

Physical Stimulation of Various Components of the Wagering Gaming Device

The present invention provides a wagering gaming device which provides physical stimulation to a player when the player touches, activates or actuates an input device of the wagering gaming device. The input device includes a component stimulator and an actuation member. The component stimulator functions with the actuation member of the input device to provide the physical stimulation to the player. The processor controls the component stimulator. The processor, depending on the gaming event displayed by the display device, sends one or more signals to the component stimulator. The component stimulator moves in correlation to these signals, thereby physically stimulating the actuation member of the input device.

Figure 3:
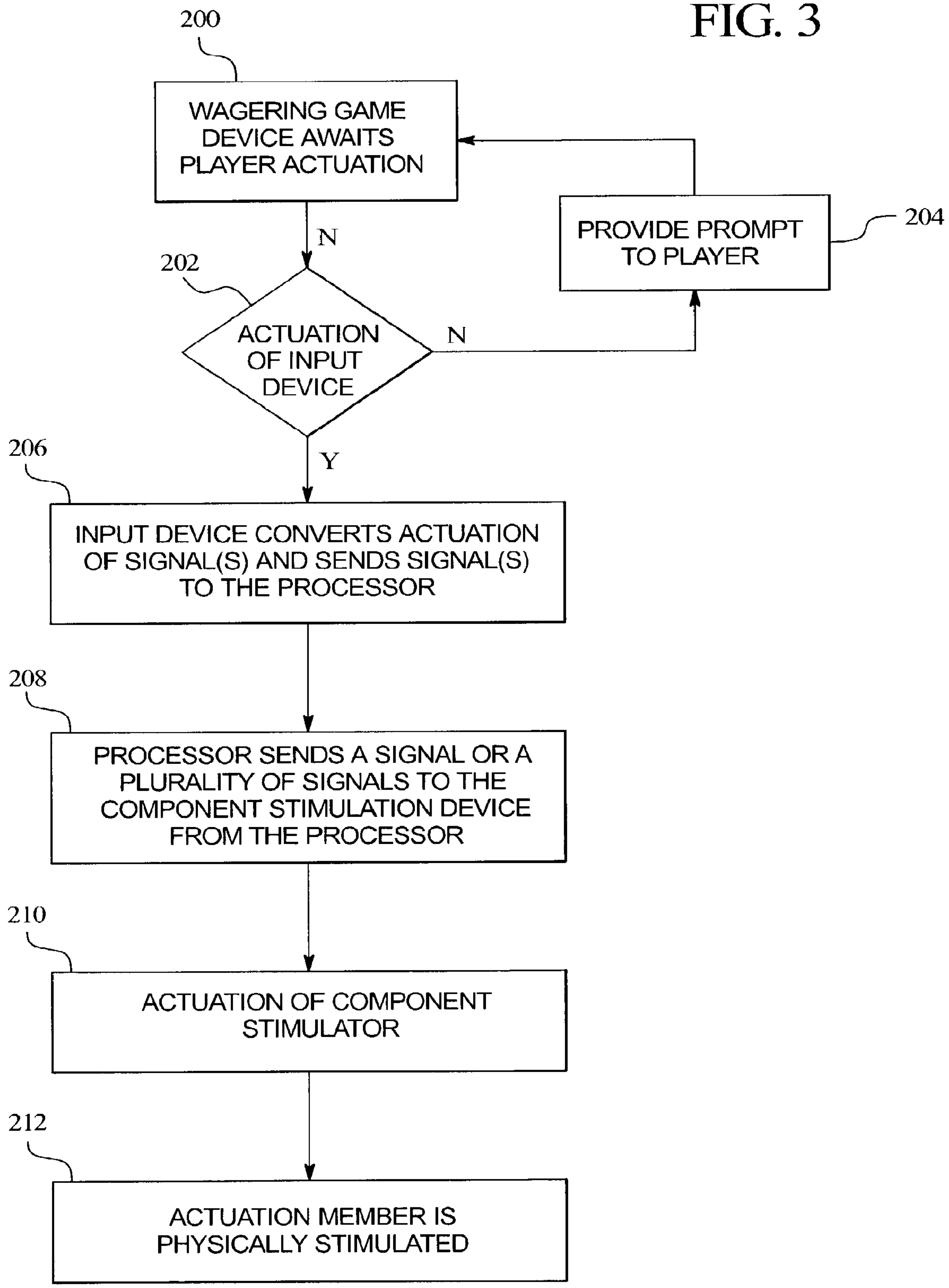
FIG. 3 is a flow diagram of a process of one embodiment of the present invention.

FIG. 3 generally illustrates one method of one embodiment of the present invention. In the first step, upon a triggering event, which causes employment of the present invention, the wagering gaming device awaits player interaction, as illustrated in block 200. It may or may not receive player interaction, as illustrated in diamond 202. If the wagering gaming device does not receive player activation, it can provide a prompt to the player, as illustrated in block 204, and it remains in an active state as illustrated in block 200. If it does receive player actuation, the input device sends a signal or a plurality of signals to the processor, as illustrated in block 206. The processor determines whether there should be physical stimulation of the actuation member. If it determines that there should be physical stimulation, it sends a signal or a plurality of signals to the component stimulator, as illustrated in block 208. These signals cause the component stimulator to physically stimulate the actuation member. The actuation member is physically stimulated, as illustrated in block 212. In one embodiment, the game ends and the wagering game device awaits player activation. In another embodiment, the game continues and continues in a manner typical of other wagering games. In another example, continuation of the game allows the player to actuate an input device. The input device may be an input device capable of physical stimulation, having a component stimulator and actuation member, or may be a typical input device. In another example, the processor sends a signal or a plurality of signals to the component stimulator, causing the component stimulation device to physically stimulate the actuation member again.

Figure 4A:
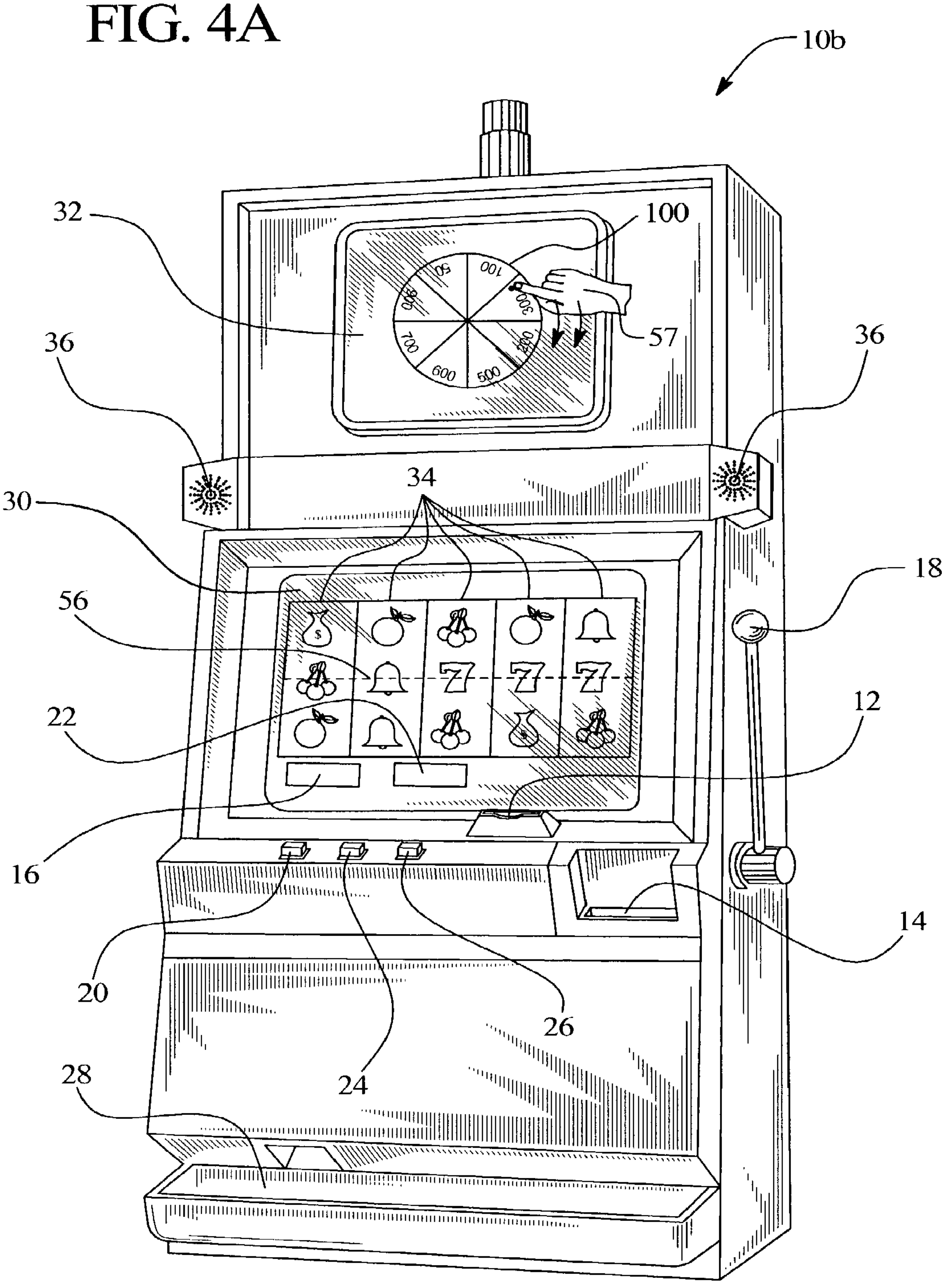
FIG. 4A is a perspective view of a wagering gaming device including a touch screen displaying a wheel and the section of the touch screen displaying the wheel is physically stimulated in correlation with a game result.
Figure 4B:
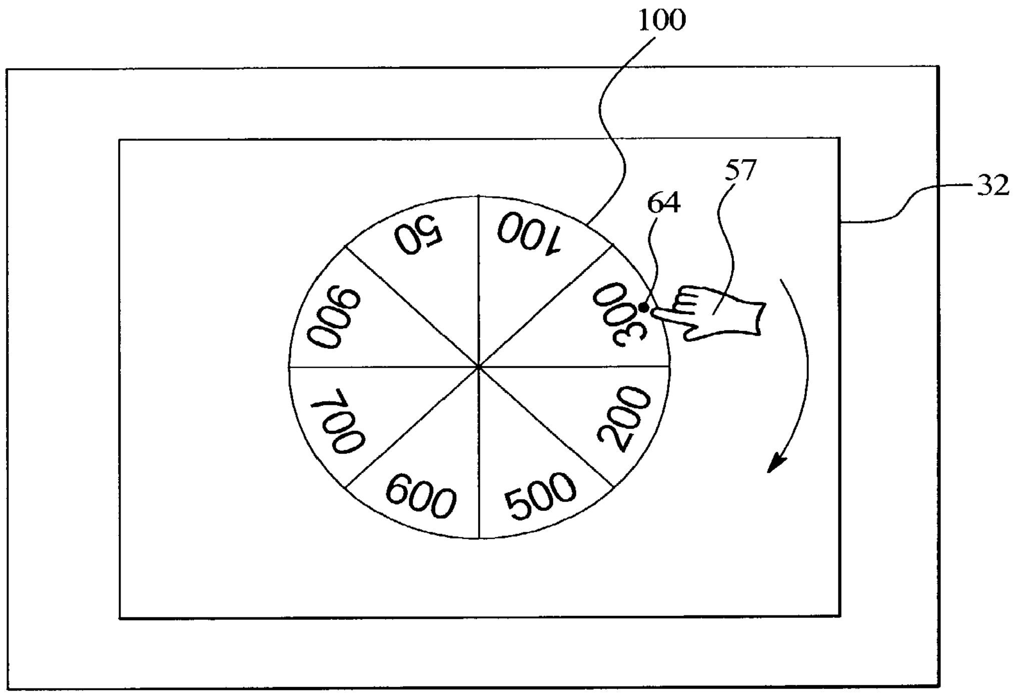
FIGS. 4B and 4C are front plan views of the display device of the embodiment of FIG. 4A, and the movement of a hand to actuate the wheel, which receives pulsation.
Figure 4C:
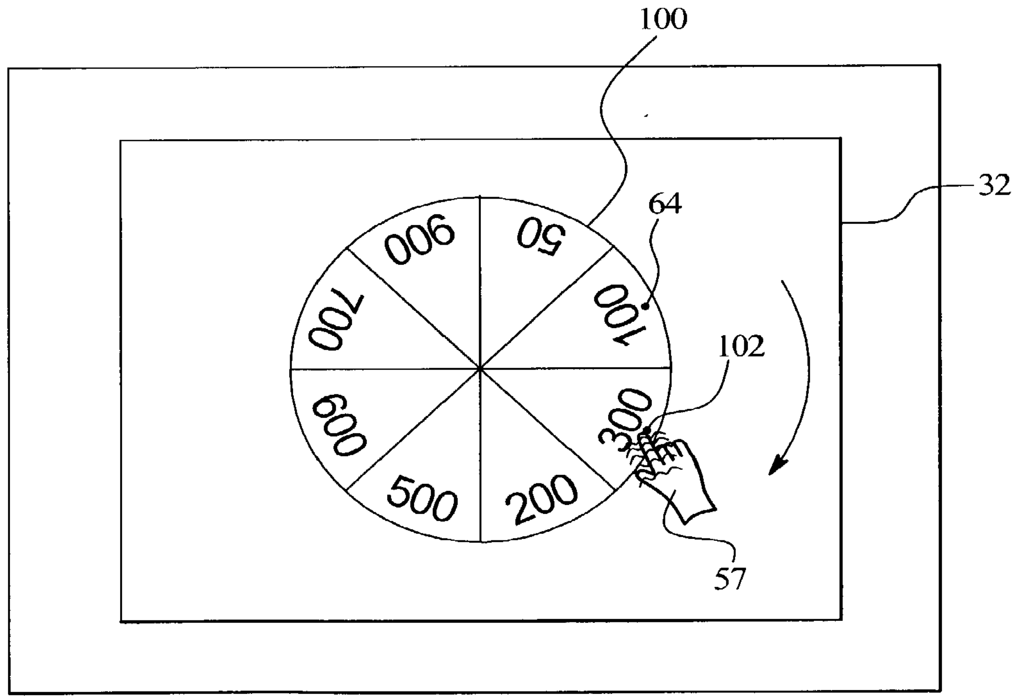

In one embodiment, a component stimulator physically stimulates an actuation member, which is a portion of the touch screen 32 upon a gaming event. In this example, the display device 32 includes a touch screen and a video image, as illustrated in FIGS. 4A, 4B and 4C. In this example, the video image is of a wheel 100. The touch screen provides a uniform electric field. Voltage is applied to the four corners of the touch screen, spreading out voltage across the screen. The touch of a member, such as a finger, to the touch screen generates an electric current from each side of the screen. The touch screen is connected to and communicates with the processor of the wagering gaming device via a touch screen controller (see FIG. 2). The touch screen controller detects any such contact with the touch screen and sends a signal or a plurality of signals representing the contacted coordinates to the processor. The processor sends a signal or a plurality of signals to the component stimulator, which physically stimulates the actuation member. The component stimulator provides physical stimulation to the contacted coordinates of the actuation member in correlation to the video image.

In one embodiment, a wagering gaming device displays a virtual wheel 100 as illustrated in FIG. 4A. The player can touch the display screen 32 with a member, such as the player's finger 57, in an area in which the wheel 100 is displayed (and in one embodiment, drag the member in a circular motion along the touch screen 32) to actuate the wheel 100, as illustrated in FIGS. 4B and 4C. The signals from the touch screen 32 are sent to the processor via the touch screen controller. As the wheel 100 moves or begins to move, the component stimulator physically stimulates the actuation member, for example through pulsation, at the point of contact 102 causing the contacted point of the screen panel to pulsate, as illustrated in FIG. 4C. The player then feels the pulsation 102 as illustrated in FIGS. 4B and 4C. It should be appreciated the video image may be any suitable game element and that the physical stimulation may be any type of suitable stimulation. It should also be appreciated that the physical stimulation is not limited to correlation with a video image and may be correlated to any other gaming component.

In one such embodiment, the wheel may pulsate directly upon touch of a game element. For example, when a player touches the wheel to make it spin, the wheel pulsates or vibrates at the point of contact before it begins spinning. In another example, the entire game element may move upon actuation. For example, upon touch of the wheel, the entire area of the image of the wheel may vibrate, not just the contacted points.

In another embodiment, contact with the touch screen causes a vibration an event unrelated to the game displayed to occur. For example, a player touches the screen which vibrates almost instantaneously upon touch in the manner described above, and instructions flash across the screen directing the player how to play the game. In another example, audio instructions are provided through the speakers.

In another embodiment, the actuation member of the input device is stimulated by the component stimulator during game play after initiation of the game. In one example involving a video poker game, a player may contact the touch screen at a certain point to hold certain cards and draw additional cards. The processor sends a signal to the component stimulator. The component stimulator vibrates the actuation member where the images of the cards are located to provide feedback to the player.

Figure 5A:
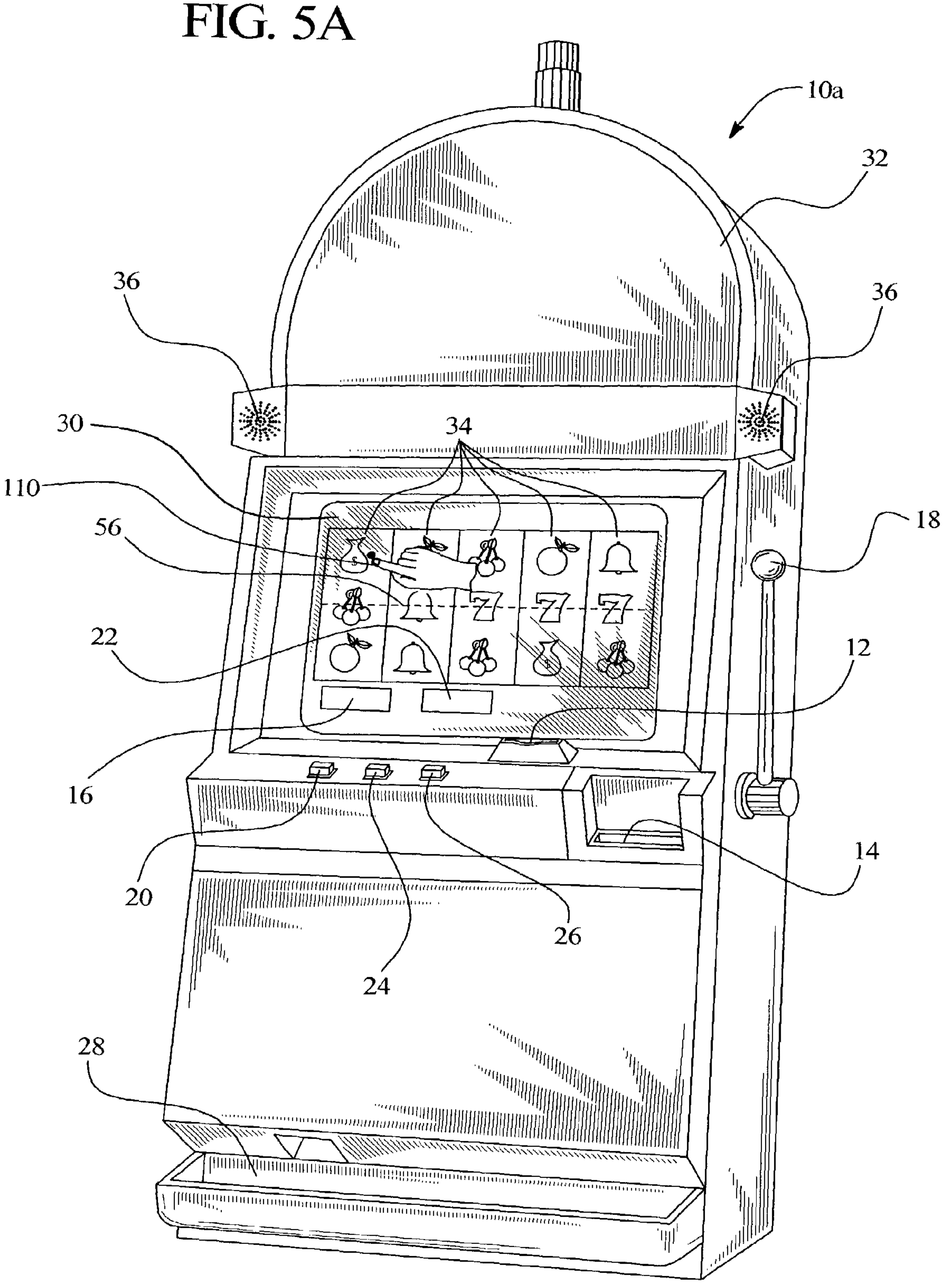
FIG. 5A is a perspective view of a wagering gaming device including a touch screen displaying reels, which pulsate upon actuation.
Figure 5B:
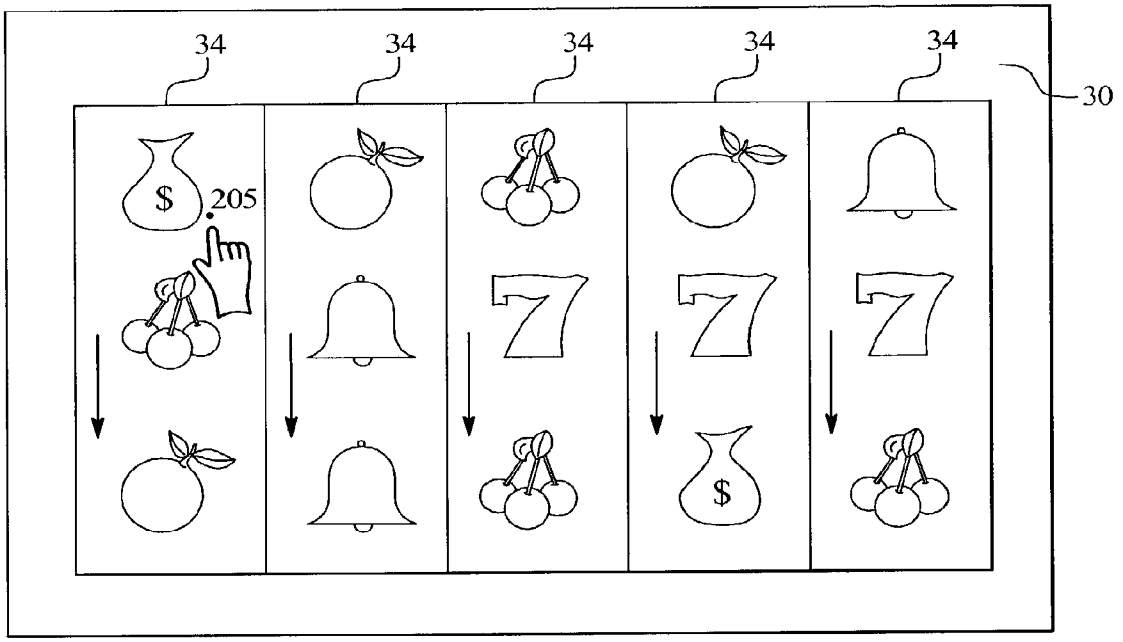
FIGS. 5B and 5C are front plan views of the display device of the embodiment in 4A, and the movement of a hand to actuate the reels, which receives pulsation.
Figure 5C:
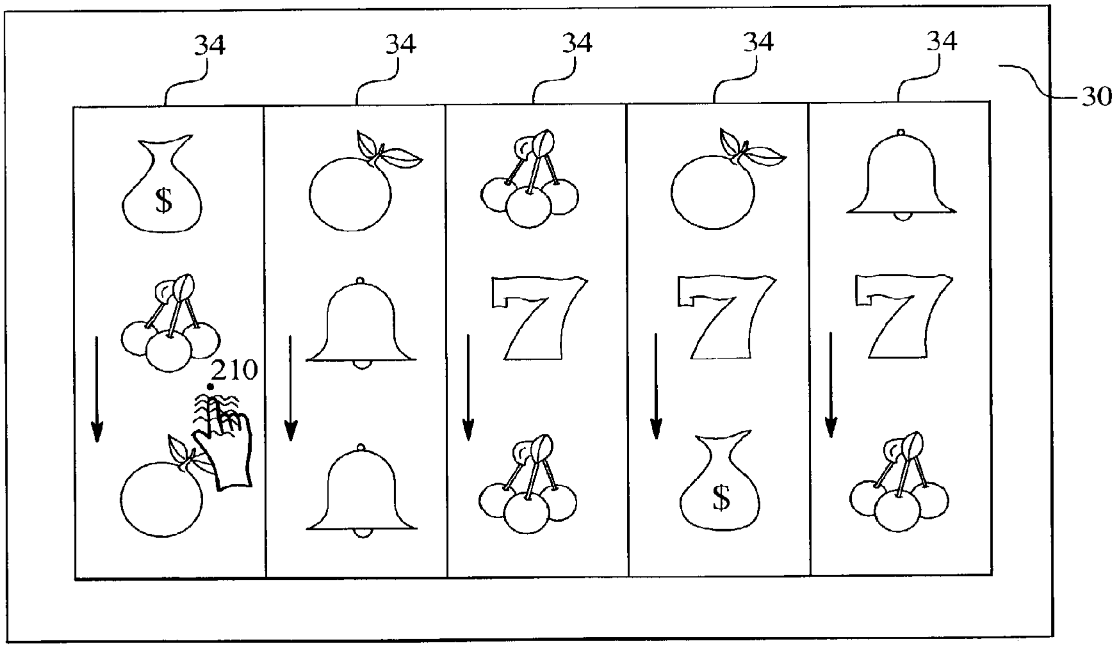

In one example, the wagering gaming device displays a set of virtual reels 34 as illustrated in FIGS. 5A through 5C. The player contacts the touch screen 30 with a member, such as a finger 110, in an area in which the reels are displayed 208 and the player drags the member in a downward motion to actuate the reels in a manner similar to that described above. As the player drags his or her finger along the touch screen 30 from point 208 to point 210, the touch screen controller sends a signal or plurality of signals to the processor wherein the signals represent the contacted coordinates. The processor sends a plurality of signals to the component stimulation device, thereby stimulating the actuator member at the points of contact, as illustrated in FIGS. 5B and 5C. The player then feels the vibrations 210 as the reels spin, as illustrated in FIGS. 5B and 5C. In another example, the processor sends signals to the component stimulator to stimulate the points of contact, as well as the next set of points in the direction the player is moving his or her finger. For example, if the player is moving the member starting at point 208 downward to point 210, the component stimulator physically stimulates the actuation member at all of the points between 208 through 210 and continues stimulating points beyond 210.

In an alternative embodiment, the virtual reels may already be spinning when the player contacts the touch screen. As the player contacts the touch screen, the processor receives a plurality of signals from the touch screen controller and sends a signal to the component stimulator. The component stimulator then causes the actuation member to vibrate at the contacted coordinates. The player feels these vibrations.

Figure 6A:
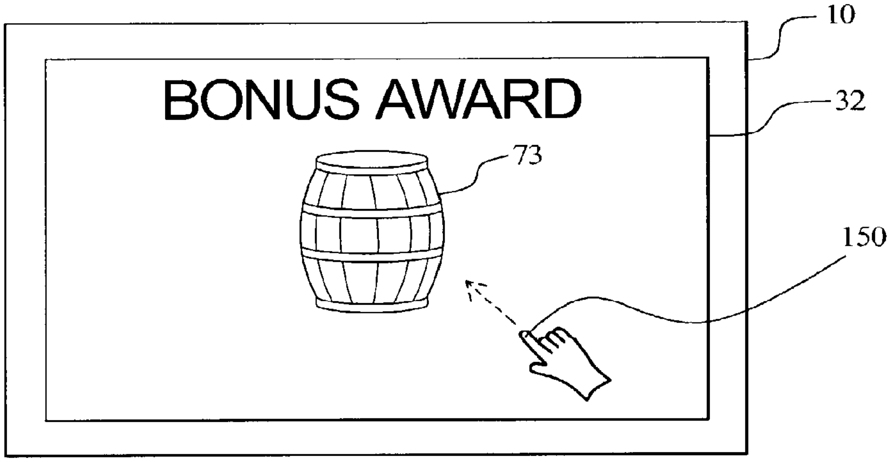
FIGS. 6A, 6B and 6C are front plan views of a display device of the wagering gaming device displaying an image of a barrel, which pulsates upon the occurrence of a bonus award.
Figure 6B:
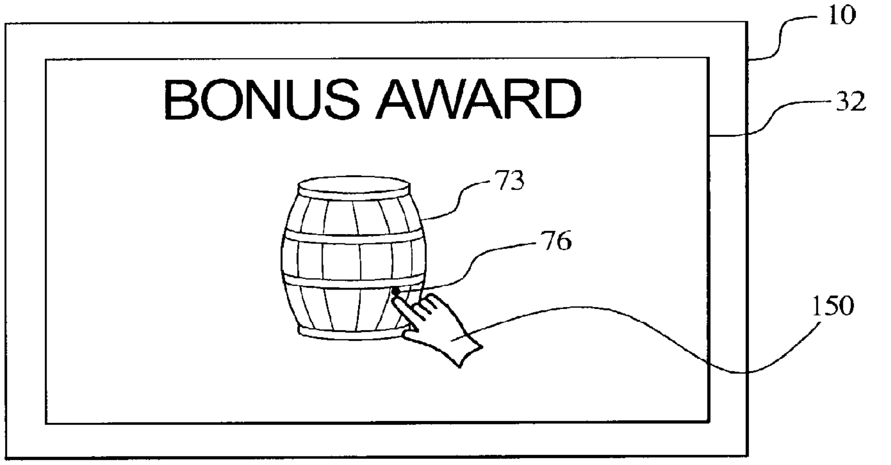
Figure 6C:
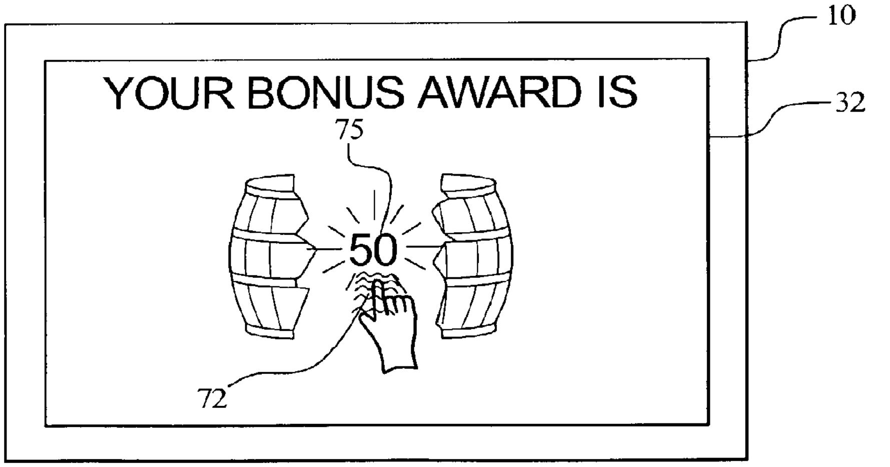

In one example, the display device 32 displays a video image 73, which may be contacted to reveal a video image of a bonus award 75 which the player achieves, as illustrated in FIGS. 6A and 6B. The video image in FIGS. 6A and 6B is a barrel although it may be of any one or more images. The player contacts the touch screen 32 with a member, such as a finger 150, in an area in which the image of the barrel is displayed such as point 76. The touch screen controller detects this contact and sends a plurality of signals to the processor. The processor then sends a signal or a plurality of signals to the component stimulator. The component stimulator stimulates the contacted area by, for example, vibrating and causing the actuation member to vibrate in correlation with, for example, one or more animated images of the barrel exploding, as illustrated in FIG. 6C.

Figure 7A:
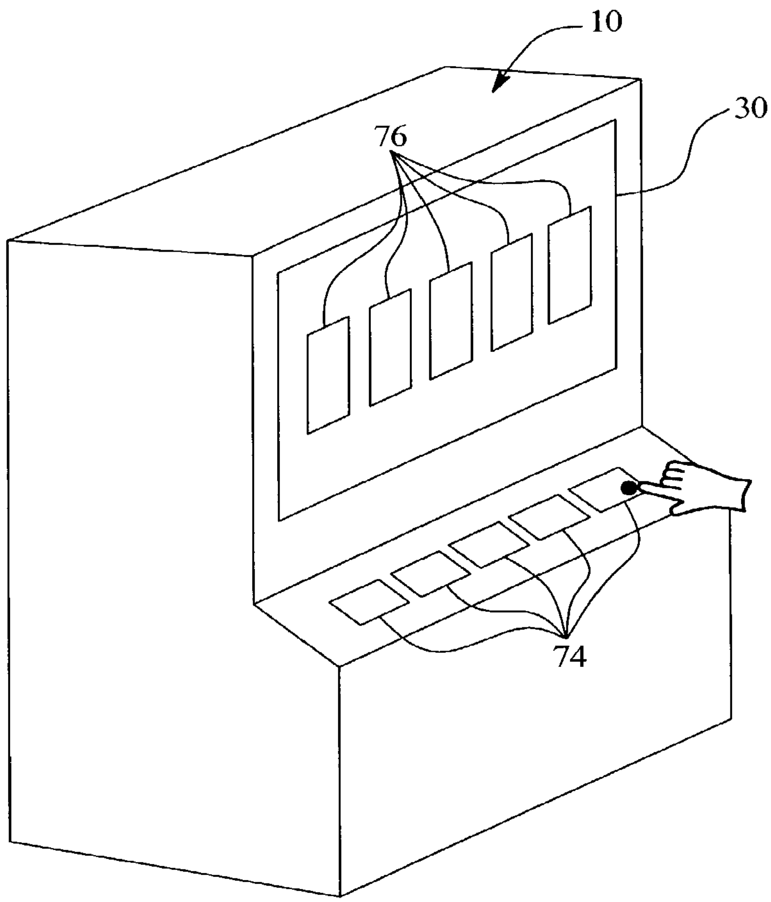
FIGS. 7A and 7B are side perspective views of the wagering gaming device of the present invention in which a player uses a button to operate the gaming device and the button receives physical stimulation upon a game result.
Figure 7B:
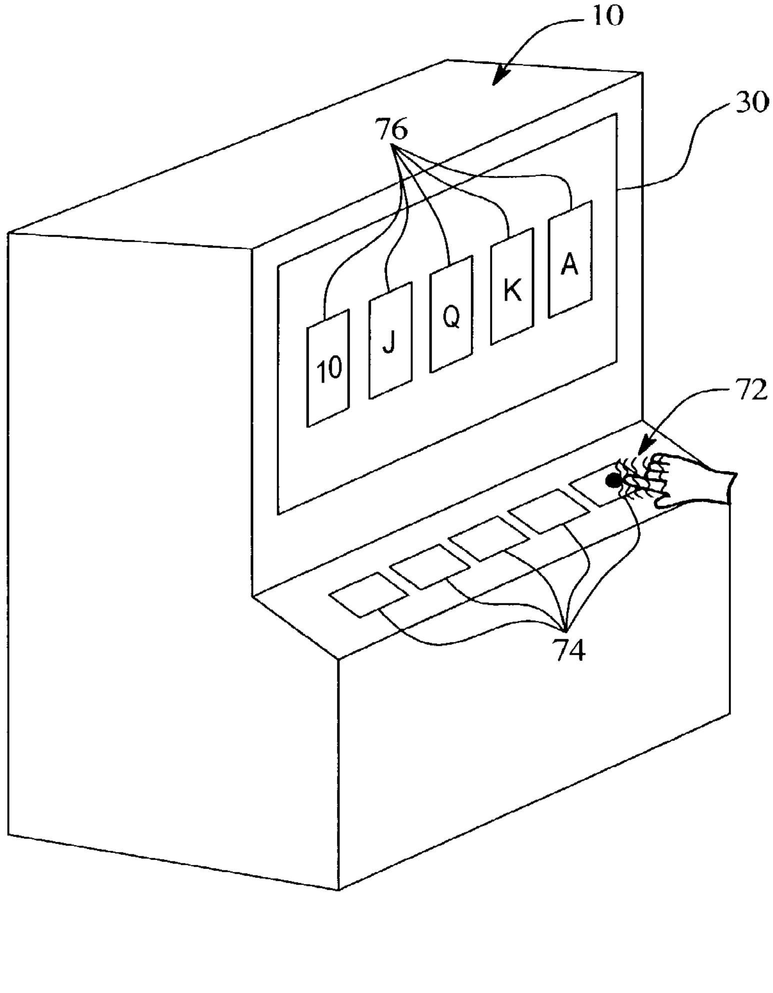
Figure 8A:
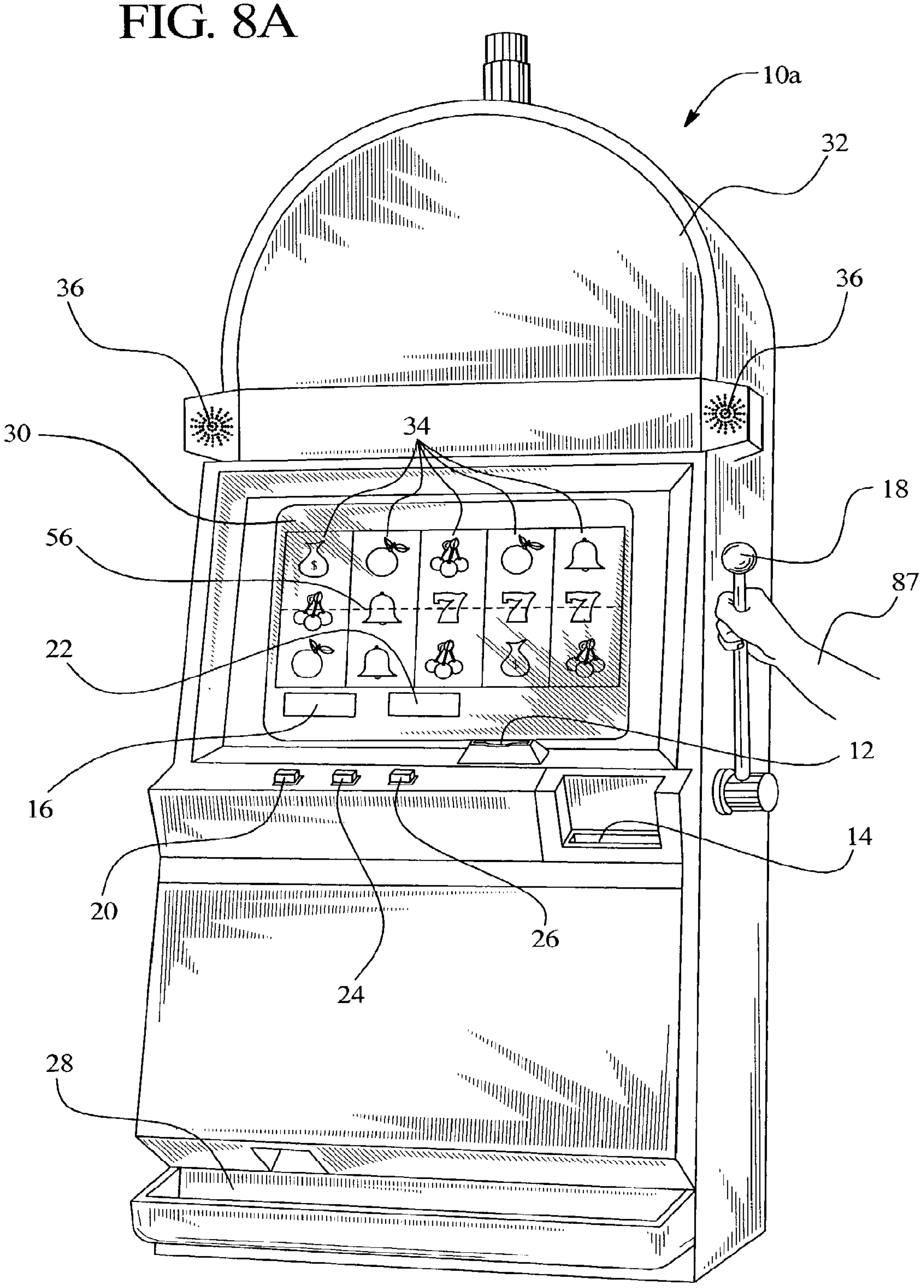
FIGS. 8A, 8B and 8C are perspective views of the wagering gaming device of the present invention in which a player uses a lever to operate the gaming device where the lever is physically stimulated upon a game result.
Figure 8B:
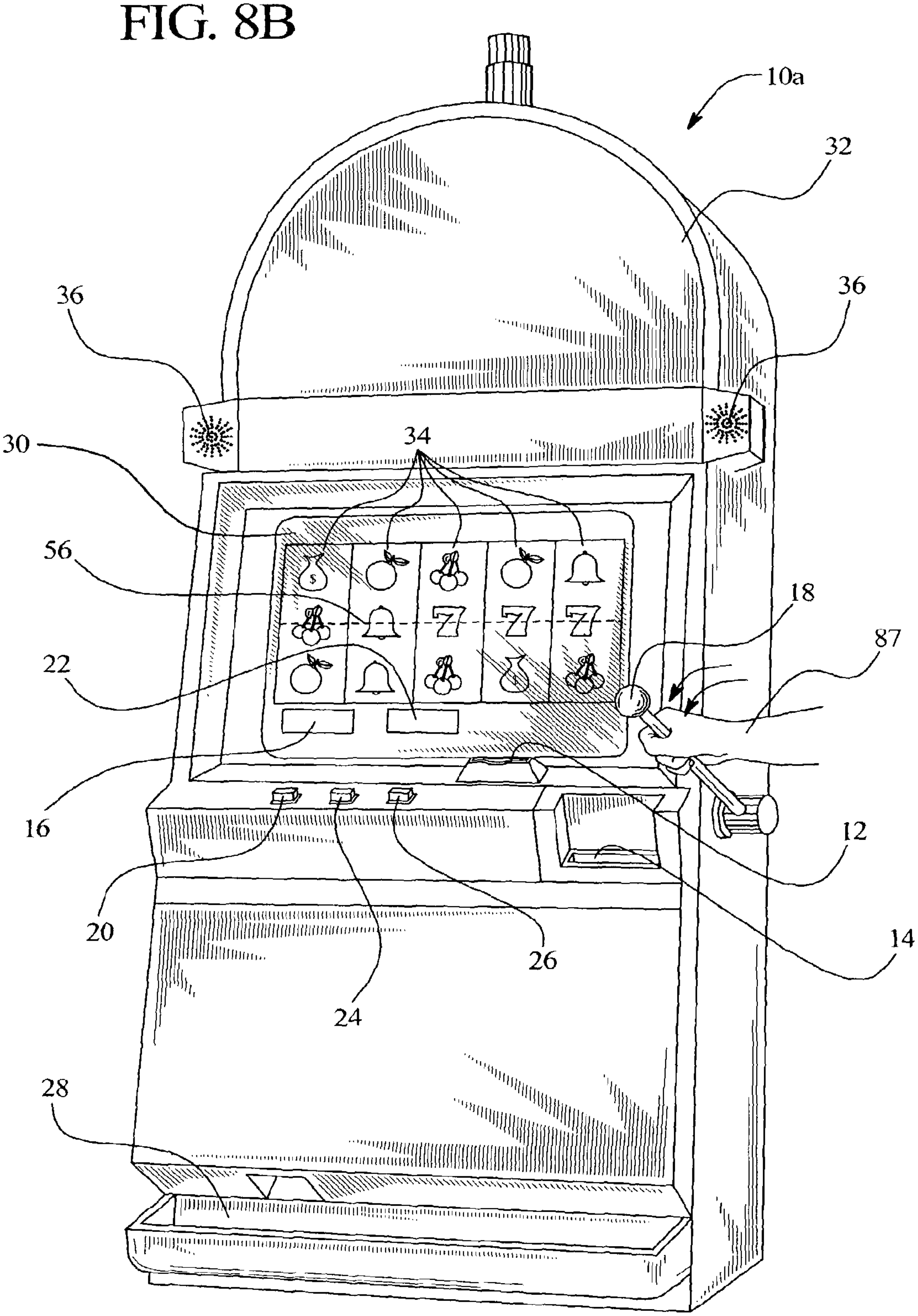

In one embodiment, an actuation member of the input device on the wagering gaming device is physically moved by a component stimulator, as illustrated in FIGS. 7A and 8B. A player input device, for example, a button 74, includes a component stimulator and an actuation member. A player receives a set of cards 76 in a video poker game. The player presses a button 74 on the wagering gaming device to hold a card received or exchange a card for another card. Upon pressing the button 74 to exchange a card, the processor acknowledges the request or input and sends a signal to the component stimulator. The component stimulator physically stimulates the actuation member of the input device, for example, by vibrating, as illustrated in FIG. 7B. It should be appreciated that the input device is not limited to a button mechanism and may be any suitable input device.

In another embodiment, the component stimulator may receive different signals for different combinations of cards, resulting in different physical stimulations of the input device. For example, the player input device is a mouse. Upon game play, the mouse may pulsate for a winning hand, but vibrate for a losing hand. It should be appreciated that this embodiment may be incorporated in other suitable manners as well. The processor may actuate the input device differently for different games, for different outcomes within the same game or in correlation to player input.

In another embodiment, the input device changes in resistance according to player input or in correlation with game initiation or a game event. In one embodiment, in a slot game, the player begins the game by pressing a button to spin the reels. The player continues pressing the button, as the reels keep spinning. The gaming device causes an increased resistance in the button. It should be appreciated, that this type of resistance may be used with other input devices and may correlate with one or more game elements or game functions.

Figure 8C:
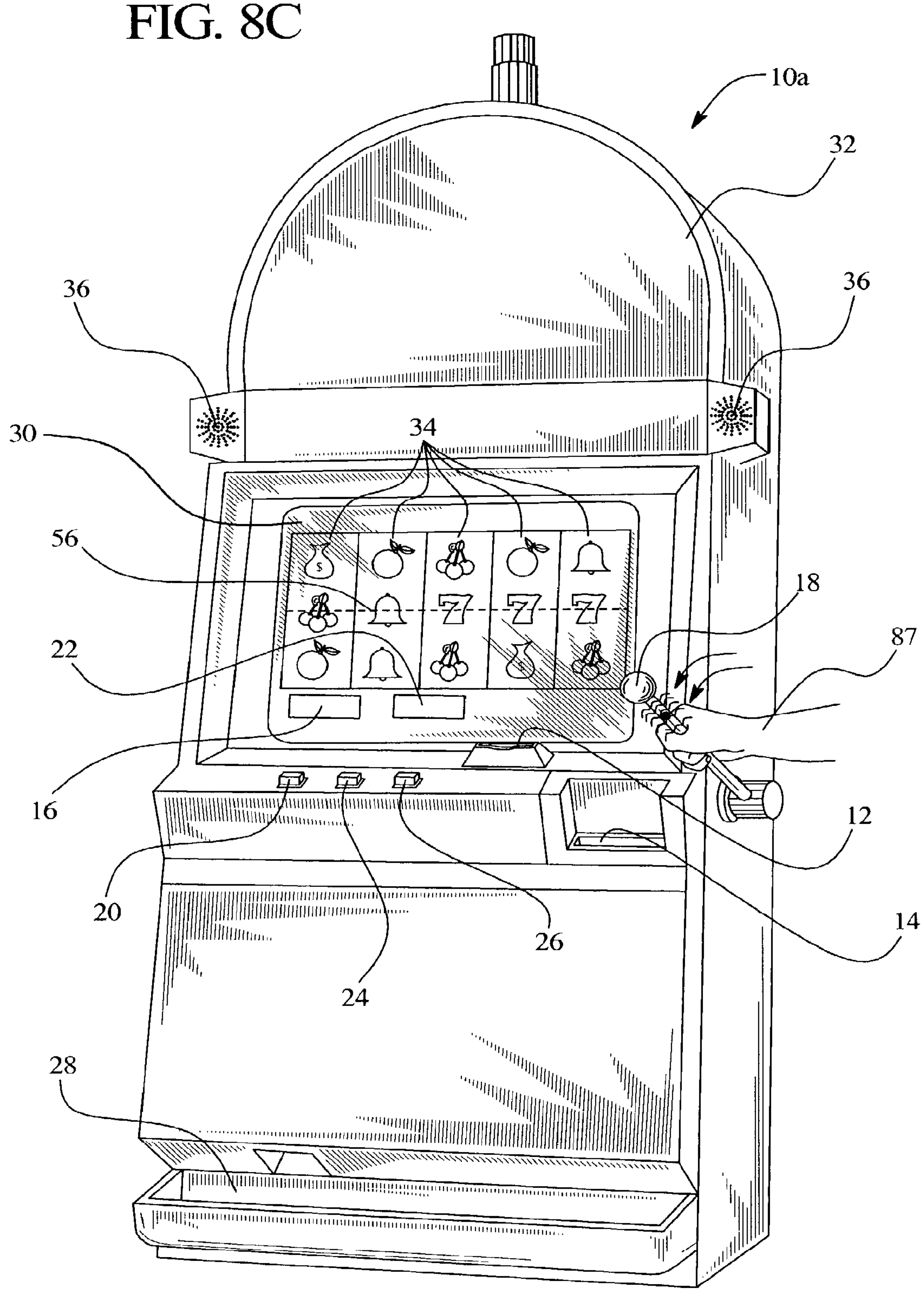

In one embodiment, the wagering gaming device includes an input device in the form of a lever mechanism having a component stimulator and actuation member. In this example, the lever 18 is in communication with the processor. The component stimulator is controlled by the processor. In one example, a wagering gaming device displays a set of reels 34 as illustrated in FIG. 8A. The player 87 pulls the lever 18 to spin the reels 34 as seen in FIG. 8B. As the reels spin, the processor sends an electronic signal to the component stimulator. The component stimulator pulsates the actuation member of the lever. The player 87 feels the pulsations 72, as illustrated in FIG. 8C.

In one embodiment, the input device is a light pen. In one example, the light pen is used to spin a set of reels in a slot machine game by contacting the display device and dragging the light pen across the display device. When the light pen contacts the display device, the processor determines the point of contact. As the player drags the light pen across the screen, the processor sends a signal to the component stimulator located within the light pen. The component stimulator physically stimulates the light pen by vibrating the actuation member as the player drags the light pen across the screen to actuate the reels.

It should be appreciated that other input devices and objects of a wagering gaming device may be stimulated by use of a component stimulator. It should also be appreciated that the component stimulator may cause other types of movements in the game components in addition to vibrations and pulsations. It should also be appreciated that the physical stimulation of the game components of the wagering gaming device may correlate to other types of displays, such as advertisements or messages.

It should also be appreciated that the form of the vibration or actuation or the member can vary in accordance with the present invention. For instance, the actuation or vibration can be fast, slow, at any suitable rate or speed, can oscillate at a predetermined rate, oscillate at randomly determined rate or be generated in any other suitable pattern or randomly determined. It should also be appreciated that the actuation or vibration could be provided in a variety of different forms such that the stimulation provided to the player through the actuation member feels like different types of objects such as bumps or sandpaper. The vibration or actuation can thus be uniform, non-uniform, evenly distributed, unevenly distributed or created sequentially or simultaneously. It should thus be appreciated that the actuation, vibration or other physical movement or stimulation provided by the invention can simulate any suitable object or feeling or motion.

In further embodiments of the present invention, other devices could be used to create the stimulation or actuation or the actuation member of the input device. In one embodiment, a solenoid is used to engage the player. In another embodiment, a spinning motor provides the actuation of the actuation member. In a further embodiment, a sonic device such as a speaker provides the actuation of the actuation member of the input device.

In a further embodiment of the present invention, the actuation of the input device is provided through a tethered member connected to and extending from the gaming device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, said plurality of input devices including:

(i) a touch screen panel, (ii) a component stimulator, (iii) an acceptor of a first physical item associated with a first monetary value, (iv) a validator configured to identify the first physical item, and (v) a cashout device configured to receive an input to cause an initiation of a payout associated with a credit balance;

at least one processor; and at least one memory device storing a plurality of instructions, which when executed by the at least one processor, cause the at least one processor to operate with the at least one display device and the plurality of input devices to:

(a) display a play of a game upon a wager;

(b) cause an indication to a player that the player is required to make an input using the touch screen panel;

(c) determine whether to cause the component stimulator to move the touch screen panel for said required player input prior to receipt of the required player input; and (d) if the determination is to cause the component stimulator to move the touch screen panel, instantly upon receipt of the required player input, send a signal to the component stimulator which causes the component stimulator to move the touch screen panel.

2. The gaming system of claim 1, wherein the touch screen panel is activatable in response to a game event in said play of said game.

3. The gaming system of claim 1, wherein the component stimulator is configured to cause a vibration of the touch screen panel.

4. The gaming system of claim 1, wherein the component stimulator is configured to cause a pulsation of the touch screen panel.

5. The gaming system of claim 1, which includes a bonus game, and wherein the indication to the player that the player is required to make an input using the touch screen panel occurs during play of the bonus game.

6. The gaming system of claim 1, wherein the at least one processor is remote from the housing.

7. A gaming device comprising:

a housing;

a display monitor supported by the housing;

a touch screen panel supported by the housing;

a touch screen controller connected to the touch screen panel;

at least one component stimulator supported by the housing and connected to the touch screen panel;

an acceptor supported by the housing and configured to accept a first physical item associated with a first monetary value;

a validator supported by the housing and configured to identify the first physical item;

a cashout device supported by the housing and configured to receive an input to cause an initiation of a payout associated with a credit balance;

at least one processor; and at least one memory device storing a plurality of instructions, which when executed by the at least one processor, cause the at least one processor to operate with the display monitor, the touch screen panel, the touch screen controller, the at least one component stimulator, the acceptor, the validator and the cashout device to:

(a) display a play of a game upon a wager;

(b) cause an indication to a player that the player is required to make an input using the touch screen panel;

(c) determine whether to cause the at least one component stimulator to physically stimulate the touch screen panel for said required player input, said determination made independently from said required player input; and (d) if said determination is to cause the at least one component stimulator to physically stimulate the touch screen panel, instantly upon receipt of said required player input, send a signal to the at least one component stimulator which causes the at least one component stimulator to physically stimulate the touch screen panel.

8. The gaming system of claim 7, wherein the at least one component stimulator is configured to make the touch screen panel vibrate.

9. The gaming system of claim 7, wherein the at least one component stimulator is configured to make the touch screen panel pulsate.

10. The gaming system of claim 7, wherein the at least one component stimulator is configured to physically stimulate the touch screen panel upon occurrence of the player actuation of the touch screen panel after an occurrence of a designated game event.

11. The gaming system of claim 7, which includes a bonus game, and wherein the indication to the player that the player is required to make an input using the touch screen panel occurs during play of the bonus game.

12. The gaming system of claim 7, wherein the at least one processor is remote from the housing.

13. A gaming system comprising:

a housing;

at least one display device supported by the housing;

a plurality of input devices supported by the housing and including:

(i) a component stimulator, (ii) a touch screen panel, (iii) an acceptor of a first physical item associated with a first monetary value, (iv) a validator configured to identify the first physical item, and (v) a cashout device configured to receive an input to cause an initiation of a payout associated with a credit balance;

at least one processor; and at least one memory device storing a plurality of instructions, which when executed by the at least one processor, cause the at least one processor to operate with the at least one display device and the plurality of input devices to:

(a) display a play of a game upon a wager;

(b) cause an indication to a player that the player can make an input using the touch screen panel;

(c) determine whether to cause the component stimulator to move the touch screen panel for said player input prior to receipt of said player input; and (d) if the determination is to cause the component stimulator to move the touch screen panel, instantly upon receipt of the player input, send a signal to the component stimulator which causes the component stimulator to move the touch screen panel.

14. The gaming system of claim 13, wherein the touch screen panel of the input device is activatable in response to a game event in said play of said game.

15. The gaming system of claim 13, wherein the component stimulator is configured to cause a vibration of the touch screen panel.

16. The gaming system of claim 13, wherein the component stimulator is configured to cause a pulsation of the touch screen panel.

17. The gaming system of claim 13, which includes a bonus game, and wherein the indication to the player that the player can make the input using the touch screen panel occurs during play of the bonus game.

18. The gaming system of claim 13, wherein the at least one processor is remote from the housing.

19. A gaming system comprising:

a housing;

a display monitor supported by the housing;

a touch screen panel supported by the housing;

a touch screen controller connected to the touch screen panel;

at least one component stimulator supported by the housing and connected to the touch screen panel;

an acceptor supported by the housing and configured to accept a first physical item associated with a first monetary value;

a validator supported by the housing and configured to identify the first physical item;

a cashout device supported by the housing and configured to receive an input to cause an initiation of a payout associated with a credit balance at least one processor; and at least one memory device storing a plurality of instructions, which when executed by the at least one processor, cause the at least one processor to operate with the display monitor, the touch screen panel, the touch screen controller, the at least one component stimulator, the acceptor, the validator and the cashout device to:

(a) display a play of a game upon a wager;

(b) cause an indication to a player that the player can make an input using the touch screen panel;

(c) determine whether to cause the at least one component stimulator to physically stimulate the touch screen panel for said player input, said determination made independently from said player input; and (d) if said determination is to cause the at least one component stimulator to physically stimulate the touch screen panel, instantly upon receipt of said player input, send a signal to the at least one component stimulator which causes the at least one component stimulator to physically stimulate the touch screen panel.

20. The gaming system of claim 19, wherein the at least one component stimulator is configured to make the touch screen panel vibrate.

21. The gaming system of claim 19, wherein the at least one component stimulator is configured to make the touch screen panel pulsate.

22. The gaming system of claim 19, wherein the at least one component stimulator is configured to physically stimulate the touch screen panel upon occurrence of the player actuation of the touch screen panel upon an occurrence of a game event.

23. The gaming system of claim 19, which includes a bonus game, and wherein the indication to the player that the player can make the input using the touch screen panel occurs during play of the bonus game.

24. The gaming system of claim 19, wherein the at least one processor resides remote from the housing.

25. A gaming system comprising:

a housing;

at least one display device supported by the housing;

a plurality of input devices supported by the housing and including:

(i) a component stimulator, (ii) a touch screen panel, (iii) an acceptor of a first physical item associated with a first monetary value, (iv) a validator configured to identify the first physical item, and (v) a cashout device configured to receive an input to cause an initiation of a payout associated with a credit balance;

at least one processor; and at least one memory device storing a plurality of instructions, which when executed by the at least one processor, cause the at least one processor to operate with the at least one display device and the plurality of input devices to:

(a) display a play of a game upon a wager;

(b) cause an indication to a player that the player can make an input using the touch screen panel at one of a plurality of different input locations on the touch screen panel;

(c) determine if the player made an input at one of a designated number of the input locations, wherein said designated number is at least one and less than all of the different input locations; and (d) instantly upon receipt of said designated number of inputs, send a signal to the component stimulator which causes the component stimulator to move the touch screen panel at said designated input location.

26. The gaming system of claim 25, wherein the touch screen panel of the input device is activatable in response to a game event in said game.

27. The gaming system of claim 25, wherein the component stimulator is configured to cause a vibration of the touch screen panel.

28. The gaming system of claim 25, wherein the component stimulator is configured to cause a pulsation of the touch screen panel.

29. The gaming system of claim 25, wherein the component stimulator is configured to cause a resistance of the touch screen panel.

30. The gaming system of claim 25, wherein the component stimulator is configured to cause a pattern of movement of the touch screen panel.

31. The gaming system of claim 25, which includes a bonus game, and wherein the indication to the player that the player can make the input using the touch screen panel occurs during play of the bonus game.

32. The gaming system of claim 25, wherein the at least one processor resides remote from the housing.

33. A gaming system comprising:

a housing;

at least one display device supported by the housing;

a plurality of input devices supported by the housing and including:

(i) a component stimulator, (ii) a touch screen panel, (iii) an acceptor of a first physical item associated with a first monetary value, (iv) a validator configured to identify the first physical item, and (v) a cashout device configured to receive an input to cause an initiation of a payout associated with a credit balance;

at least one processor; and at least one memory device storing a plurality of instructions, which when executed by the at least one processor, cause the at least one processor to operate with the at least one display device and the plurality of input devices for a play of a game to:

(a) display the play of the game upon a wager;

(b) if a specific condition has been met, wherein the specific condition does not have to occur in said play of the game, make a random determination;

(c) if the specific condition has been met, cause an indication to a player that the player can make an input using the touch screen panel and determine whether to cause the component stimulator to move the touch screen panel for said required player input prior to receipt of said required player input; and (d) if the specific condition has been met, instantly upon receipt of the player input, send a signal to the component stimulator which causes the component stimulator to move the touch screen panel.

34. The gaming system of claim 33, wherein the component stimulator is configured to cause a vibration of the touch screen panel.

35. The gaming system of claim 33, wherein the component stimulator is configured to cause a pulsation of the touch screen panel.

36. The gaming system of claim 33, wherein the component stimulator is configured to cause a resistance of the touch screen panel.

37. The gaming system of claim 33, wherein the component stimulator is configured to cause a pattern of movement of the touch screen panel.

38. The gaming system of claim 33, wherein said specific condition is selected from at least one of the group consisting of an entry into a bonus game, a bonus game event, a generation of a designated game outcome and a designated player input.

39. The gaming system of claim 33, which includes a bonus game, and wherein the indication to the player that the player can make the input using the touch screen panel occurs during play of the bonus game.

40. The gaming system of claim 33, wherein the at least one processor resides remote from the housing.

* * * * *

UNITED STATES PATENT AND TRADEMARK OFFICE

CERTIFICATE OF CORRECTION

PATENT NO. : 9,076,306 B2
APPLICATION NO. : 12/031647
DATED : July 7, 2015
INVENTOR(S) : Nicole M. Beaulieu et al.

It is certified that error appears in the above-identified patent and that said Letters Patent is hereby corrected as shown below:

IN THE CLAIMS

In Claim 7, Column 10, Line 21, replace "device" with --system--.
In Claim 22, Column 12, Line 36, delete the second instance of "the".

Signed and Sealed this
Twenty-second Day of March, 2016

Michelle K. Lee
*Director of the United States Patent and Trademark Office*